US009022208B2

(12) United States Patent
Huber

(10) Patent No.: US 9,022,208 B2
(45) Date of Patent: May 5, 2015

(54) FREIGHT LOADING SYSTEM AND METHOD FOR CONTROLLING A PLURALITY OF FREIGHT HANDLING DEVICES

(75) Inventor: Thomas Huber, Schliersee (DE)

(73) Assignee: Telair International GmbH (DE)

( * ) Notice: Subject to any disclaimer, the term of this patent is extended or adjusted under 35 U.S.C. 154(b) by 0 days.

(21) Appl. No.: 13/984,202

(22) PCT Filed: Jan. 23, 2012

(86) PCT No.: PCT/EP2012/050953
§ 371 (c)(1),
(2), (4) Date: Aug. 7, 2013

(87) PCT Pub. No.: WO2012/110282
PCT Pub. Date: Aug. 23, 2012

(65) Prior Publication Data
US 2013/0313073 A1 Nov. 28, 2013

(30) Foreign Application Priority Data

Feb. 18, 2011 (DE) .......................... 10 2011 000 820

(51) Int. Cl.
*B64D 9/00* (2006.01)
*B65G 43/00* (2006.01)

(52) U.S. Cl.
CPC . *B65G 43/00* (2013.01); *B64D 9/00* (2013.01)

(58) Field of Classification Search
USPC .......... 198/575, 781.01, 781.05, 781.06, 784, 198/788; 244/118.1, 137.1; 700/228, 230
See application file for complete search history.

(56) References Cited

U.S. PATENT DOCUMENTS

| | | | | |
|---|---|---|---|---|
| 4,006,869 A | * | 2/1977 | Vogele | 244/137.1 |
| 4,225,926 A | * | 9/1980 | Wendt | 701/124 |
| 4,852,721 A | * | 8/1989 | Stille | 198/782 |
| 5,213,201 A | * | 5/1993 | Huber et al. | 198/781.06 |

(Continued)

FOREIGN PATENT DOCUMENTS

| | | |
|---|---|---|
| DE | 102008052468 A1 | 5/2009 |
| EP | 0937643 A2 | 8/1999 |
| GB | 2443554 A | 5/2008 |

OTHER PUBLICATIONS

English translation of International Preliminary Report on Patentability and Written Opinion in PCT Application PCT/EP2012/050953, dated Aug. 21, 2013.

(Continued)

*Primary Examiner* — Douglas Hess
(74) *Attorney, Agent, or Firm* — Barnes & Thornburg LLP

(57) ABSTRACT

The application relates to freight loading systems for transporting freight items. Corresponding freight loading system comprises a freight deck having a plurality of freight handling devices, a control device which is communicatively connected to the freight handling devices in order to handle at least one freight item on the freight deck, and a remote control, which is communicatively connected to the control device in order to output control signals to the control device. The control device is intended to comprise a position determination unit for determining a remote control position on the freight deck and/or the orientation of the remote control, wherein the control unit is designed to select a number of freight handling devices and drive same depending on the control signals received and the remote control position and/or orientation of the remote control. This allows easier control of the freight items on the freight deck.

18 Claims, 5 Drawing Sheets

(56) References Cited

U.S. PATENT DOCUMENTS

| | | | | |
|---|---|---|---|---|
| 5,547,069 | A * | 8/1996 | Pritchard | 198/782 |
| 5,716,028 | A * | 2/1998 | Evans et al. | 244/137.1 |
| 5,749,543 | A * | 5/1998 | Huber | 244/118.1 |
| 6,279,730 | B1 * | 8/2001 | Schreger et al. | 198/722 |
| 6,328,154 | B1 * | 12/2001 | Huber | 198/782 |
| 6,694,220 | B1 * | 2/2004 | Tanz | 700/226 |
| 6,867,702 | B2 * | 3/2005 | Huber et al. | 340/679 |
| 7,402,973 | B2 * | 7/2008 | Hettwer | 318/563 |
| 7,604,204 | B2 * | 10/2009 | Jacobsen et al. | 244/137.1 |
| 7,673,738 | B2 * | 3/2010 | McConnell | 198/782 |
| 7,779,994 | B1 * | 8/2010 | Travis | 198/810.02 |
| 7,908,976 | B2 * | 3/2011 | Pujol | 105/422 |
| 7,954,621 | B2 * | 6/2011 | Brandt et al. | 198/341.01 |
| 7,991,505 | B2 * | 8/2011 | Lert et al. | 700/214 |
| 8,308,107 | B2 * | 11/2012 | Hettwer | 244/118.1 |
| 8,500,383 | B2 * | 8/2013 | Schmidgall | 414/509 |
| 8,668,429 | B2 * | 3/2014 | Angleitner | 414/796.6 |
| 2009/0121085 | A1 | 5/2009 | Hettwer | |
| 2010/0213313 | A1 | 8/2010 | Reed et al. | |

OTHER PUBLICATIONS

PCT International Search Report in PCT EP2012/050953, dated Jun. 26, 2012.

* cited by examiner

FREIGHT LOADING SYSTEM AND METHOD FOR CONTROLLING A PLURALITY OF FREIGHT HANDLING DEVICES

RELATED APPLICATIONS

This patent application is a U.S. nationalization under 35 U.S.C. §371 of International Application No. PCT/EP2012/050953, filed Jan. 23, 2012, which claims priority to German Patent Application No. 10 2011 000 820.9, filed Feb. 18, 2011.

BACKGROUND

The invention concerns a freight loading system and a method for controlling a plurality of freight handling devices on a freight deck.

To transport air freight, the freight items to be transported, in particular containers or pallets which are preferably produced to specific standards, are attached inside the cargo hold by means of locking elements on the freight deck of the cargo hold. Such locking elements frequently form freight loading tracks between which the standard freight items can be positioned. To position the freight items at the locations provided for them, loading systems or freight loading systems are used which assist the ground staff in loading and unloading. The loading systems are intended to accelerate the loading and unloading process and frequently have a plurality of actuators and sensors and a control computer which is adapted to evaluate the signals received, where applicable to output signals and implement a suitable control strategy for the actuators. The loading systems used must be very easy to operate since ground staff often receive no training in relation to a specific freight loading system. Also both loading and unloading take place under high pressure of time, whereby incorrect operation can easily occur. Such incorrect operation must absolutely be prevented. A faulty freight loading system, either because of incorrect operation or because of natural wear, can lead to substantial costs since operation of wide-bodied aircraft is very costly. Every minute a wide-bodied aircraft spends on the ground costs the operator money. Furthermore, a faulty freight loading system or incorrect operation can lead for example to damage to the cargo hold. Repair of the cargo hold is very expensive.

To structure the loading and unloading process as efficiently as possible, the freight deck has ball mats which allow the freight items to be transported on the freight deck with minimum force. Furthermore freight handling devices (PDUs: power drive units) are provided which supply the force necessary for transport. The control computer controls these freight handling devices to allow preferably substantially automatic loading and unloading. Nonetheless, on loading and unloading of aircraft, ground staff are still essential since many loading processes are highly individual because of the different dimensions of the freight items, their projections etc. So modern freight loading systems have input devices which allow the ground staff to give control commands to the control computer.

DE 10 2008 052 468 A1 shows for example a freight loading system for an aircraft comprising a control computer and a plurality of freight handling devices in communicative connection with the control computer. The control computer operates the freight handling devices such that the freight items are positioned in a suitable manner on the freight deck of the aircraft. DE 10 2008 052 468 A1 furthermore describes a remote control which enables the user to move freely on the freight deck and give suitable control commands in the form of control signals. Handling of this remote control is relatively complex. A further freight loading system is known from EP 0 937 643.

Corresponding freight loading systems are also used in logistics centres. Such logistics centres are located for example at major transhipment airports which daily receive thousands of freight items and pass these on for further transport in a suitable manner. Also frequently freight decks are provided in corresponding logistics centres, which are equipped with corresponding rollers to convey the freight items with as little friction as possible. Here too, freight handling devices can be provided which communicate with a control computer to transport the freight items in a suitable manner on the freight deck. In fact similar requirements to those already described above apply to freight loading systems in logistics centres. In particular it is necessary to make their operation as simple as possible.

Starting from DE 10 2008 052 468 A1, an object of the present invention is to provide a freight loading system which can be operated simply and efficiently. Furthermore a corresponding method is provided for controlling a plurality of freight handling devices of a freight loading system.

In particular the object is achieved by a freight loading system comprising:
  a freight deck with a plurality of freight handling devices;
  a control unit which is in communicative connection with the freight handling devices for the transport of at least one freight item on the freight deck;
  a remote control which is in communicative connection with the control unit for the output of control signals to the control unit.

An essential concept of the present invention is that the control unit is equipped with a position determination unit to determine a remote control position on the freight deck and/or the orientation of the remote control, wherein the control unit is adapted to select a quantity of freight handling devices and drive these as a function of the control signals received and the remote control position and/or orientation of the remote control.

The freight loading system according to the invention can be used both in aircraft and at any other location, in particular in logistics centres. A core concept of the invention is that the control unit knows the precise or approximate position and/or the precise or approximate orientation of the remote control, and interprets the control signals output by the remote control differently as a function of these parameters. As a result it is possible to design the remote control substantially more simply, since for example selection of the freight item to be transported on the freight deck can be made automatically. For example the control unit can assume that the freight item to be transported is always the one closest to the remote control.

It is even conceivable to allow the remote control to communicate with the control unit by hard-wired connection, but preferably a wireless communication is used. The remote control can be adapted to transmit the control signals at least partly wirelessly, in particular by means of light waves, to the control unit. To this extent it is possible for the user to move freely about the freight deck.

The position determination unit can be adapted to determine at least one freight item position of the at least one freight item on the freight deck, wherein the control unit is adapted to drive the freight handling devices as a function of the control signals received, the remote control position and/or the orientation of the remote control, and the position of the at least one freight item.

Insofar as the control unit knows both the position of the remote control and/or its orientation, and the position of the at least one freight item, these parameters can be taken into account in the interpretation of the control signals. It is for example easily possible to determine the freight item closest to the user, or the freight item which he is looking at directly. The control unit can be configured such that it assumes that the control signals output by means of the remote control always relate to the freight item which the user is looking at, that to which the remote control is pointing and/or that which is closest to the remote control.

The control device can be adapted to take into account the remote control position and/or the orientation of the remote control relative to the at least one freight item. It is however also possible to change the function method of the remote control depending on the relative position and/or orientation.

The remote control can comprise at least one first actuation device to which a "follow" control signal is allocated, wherein the control device is adapted, on reception of the "follow" control signal, to determine a transport direction in which the at least one freight item is to be transported in the direction towards the remote control position, and controls the handling device such that the at least one freight item is transported in the calculated transport direction.

The remote control can thus be used in the manner of an "electronic lead", wherein actuation of the first actuation device leads to the output of control signals which cause the control device to move a selected freight item towards the user or towards the position of the remote control. To this extent the user can walk ahead of the freight item and, by actuating the first actuation device, cause a selected freight item to follow him. The actual control of the freight handling device and the selection of a suitable transport direction need therefore no longer be made by the user, since the control device knows the position of the freight item and the position of the remote control and possibly its orientation.

Consequently the remote control can comprise at least one second actuation device to which a "back" control signal is allocated, wherein the control device is adapted, on reception of the "back" control signal, to determine a transport direction in which the at least one freight item is moved in a direction away from the remote control position, and controls the handling devices such that the at least one freight item is transported in the calculated transport direction. Similarly the remote control can have thus a second actuation device, actuation of which leads to the output of control signals which cause the control unit to move a selected freight item away from the user or from the remote control. To this extent it would for example be conceivable for the user to walk behind the freight item and guide this ahead of him. Preferably this second transport mode is used to park the freight items for example in a space without danger to the user. Theoretically it is conceivable to provide one or more further actuation devices which allow rotation of the freight item. Here too theoretically the transport strategy implemented by the control device can depend on the position and/or orientation of the remote control relative to the freight item.

Furthermore it is possible, by detecting the position of the remote control, to implement various safety mechanisms which allow protection of the user and the equipment used. For example the control device can comprise a distance determination device to determine an actual distance between the freight item position and the remote control position, and be adapted to deactivate at least the selected number of freight handling devices if the actual distance is less than a predefined safety distance. Thus for example a freight item can be prevented from running over the user. Furthermore it is conceivable to use the teaching according to the invention on a freight deck in which a plurality of users are active with a plurality of remote controls. By taking into account the distance between the remote controls and the freight items, accidents can also be avoided in which a user is run over by a "foreign" freight item.

The control system can be adapted, using the remote control position and orientation of the remote control, to select from a plurality of freight items one which is to be transported according to the control signals. To this extent the teaching according to the invention simplifies the allocation of the control signals to a specific freight item to which they relate.

The freight loading system can comprise a plurality of receiver units for receiving the control signals and preferably arranged covering the surface of the freight deck, wherein the position determination device knows the positions of the receiver units and from the positions of the receiver units which receive a control signal output by the remote control, determines the remote control position. Theoretically it is possible to determine the position of the user of the remote control or of the remote control itself by means of additional devices (e.g. GPS or local position determination systems). Preferably however the position is determined with sufficient accuracy that the control signals are received only by one or by few receiver units from the plurality of receiver units. The positions of the receiver units which receive the control signals give a sufficiently precise conclusion on the positions of the remote control or the position of the user of the remote control. It is conceivable to reduce the transmission power of the remote control such that only very few, preferably only one receiver unit receives the control signals in a particular position. Theoretically the receiver units can also be adapted to allocate to the received control signal a direction from which this is received, so that firstly the position determination is more precise and secondly conclusions can be drawn on the orientation of the remote control. Theoretically it is furthermore possible to structure the transmitter of the remote control such that individual receiver units can be addressed. This is easily possible in particular if infrared signals are used. To this extent the user can direct the remote control at a specific receiver unit which for example is allocated to a specific freight item, and thus make a selection from the freight items.

In particular the object is achieved by a method for controlling a plurality of freight handling devices of a freight loading system, in particular of a freight loading system as already described, wherein the method comprises the following steps:

reception of a control signal from a remote control, in particular by means of an IR receiver device;

determination of at least one remote control position of the remote control;

determination of at least one freight item position of at least one freight item on a freight deck;

selection of a quantity of freight handling devices arranged on the freight deck;

determination of a transport direction for each freight handling device from the selected quantity as a function of the control signal received, the remote control and the freight item position;

driving of the freight handling devices in the respective transport direction.

According to the method therefore the remote control positions and where applicable the freight item position are taken into account in the interpretation of the control signal or signals received. By taking into account these parameters, both the operating comfort and the safety can be increased during control of the plurality of freight handling devices.

The selected quantity of freight handling devices can be dependent on the remote control position determined and/or the orientation of the remote control. It is also possible using the position data not only to influence the manner in which a specific freight item is transported in response to the reception of a specific control signal, but also the selection of the freight item to be transported can depend on these data.

Determination of the remote control position can comprise determination of a primary receiver unit from a plurality of receiver units arranged on or close to the freight deck, and determination of the position of the primary receiver unit on the freight deck, wherein the primary receiver unit is the receiver unit which receives the control signal from the remote control. Naturally it is conceivable for several receiver units to receive a particular control signal. In this case for example the primary receiver unit could be the receiver unit which receives the strongest control signal. With the method specified, the position of the remote control can easily be determined.

The method can comprise calculation of an actual distance between the freight item position and the remote control position, wherein the selected freight handling devices are driven only when the actual distance is greater than a predefined safety distance. To this extent safety mechanisms can be implemented to protect the user and the equipment.

The method can comprise calculation of at least one freight distance between a first freight item and a second freight item, wherein the selected freight handling devices are driven only when the calculated freight distance between the first and second freight items, between which the remote control is located according to the specific remote control position, is greater than a predefined safety distance.

BRIEF DESCRIPTION OF THE DRAWINGS

The invention is described below by means of several embodiment examples which are explained in detail with reference to specific diagrams.

DESCRIPTION

Figure 1:
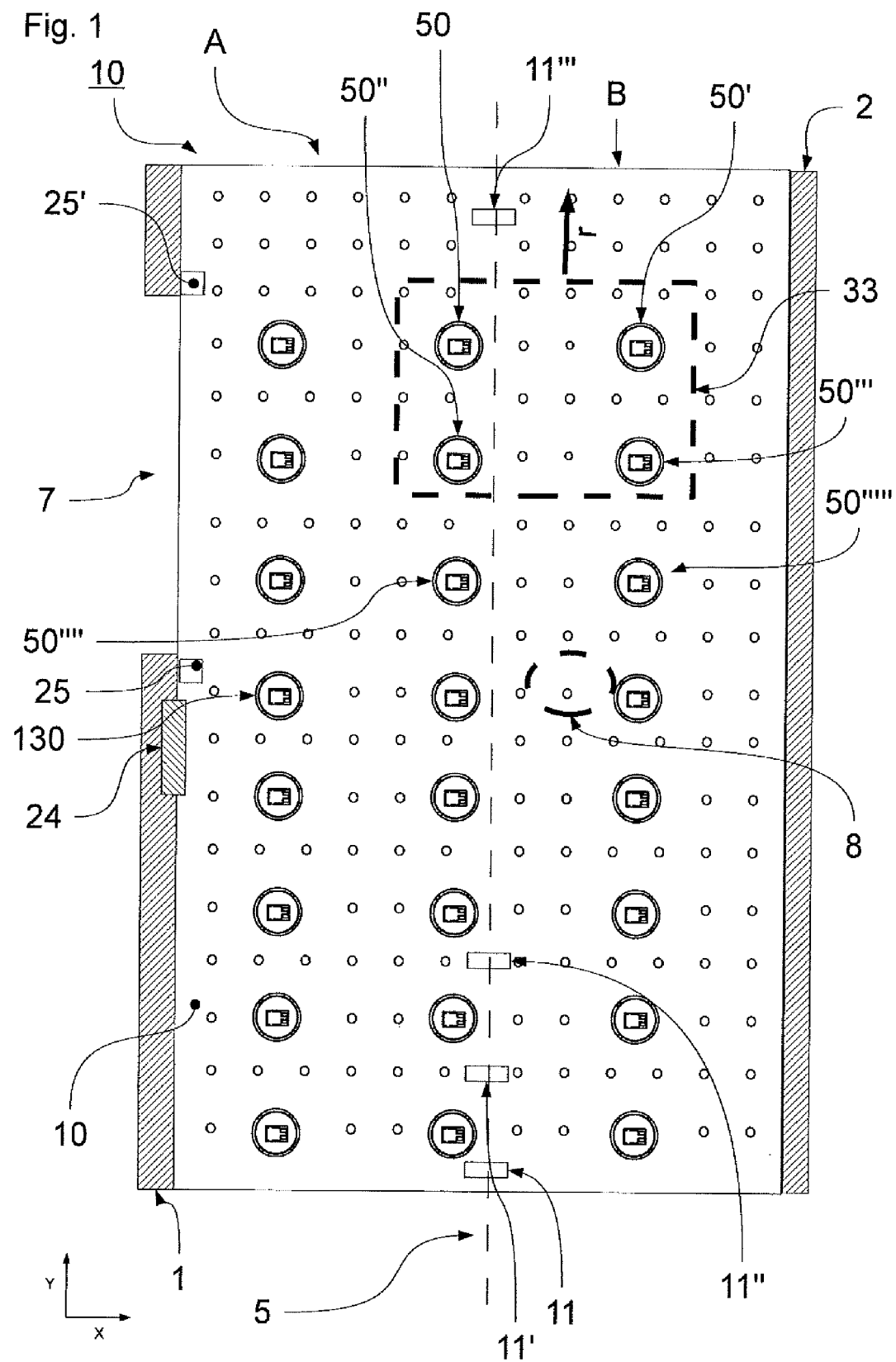
FIG. 1 shows a top view of a portion of a freight deck of an aircraft with numerous freight handling devices.

In the description which follows, the same reference numerals are used for the same parts and those with the same effect.

FIG. 1 shows a top view of a freight deck 10 with a freight loading system according to the invention. The portion of the freight deck 10 shown is substantially rectangular and extends in the X-Y plane (the Y direction corresponds to the longitudinal direction of the aircraft and the X direction to the transverse direction) of the aircraft and is delimited by a left side wall 1 and a right side wall 2. The left side wall 1 is interrupted in portions to form a door opening 7 and has an input device 24 for the input of control commands. A freight container 30 can be introduced into the cargo hold through the door opening 7. The freight loading system according to the invention is particularly suitable for transporting freight containers efficiently on the freight deck 10 under constant supervision by a user. A corresponding freight container 30 is shown for example in FIG. 6 and has a length l, a width b and a predefined height h.

The freight deck 10 of the aircraft shown in FIG. 1 is configured such that a first freight loading track A and a second freight loading track B are provided to receive individual freight containers 30. For this centre locks 11, 11', 11", 11''' are arranged along a centre plane 5 of the freight deck 10. The freight loading tracks A, B have a width which substantially corresponds to the width B of the freight container 30. Usually further function elements are provided to fix the freight container 30 to the freight loading tracks A, B in a suitable manner.

The freight deck 10 is equipped with ball mats so that the freight container 30 can be transported thereon with relatively low resistance. Furthermore a network of freight handling devices 50 to 50'''' is provided to drive the freight container 30. Preferably the freight handling devices 50 to 50' are distributed over the freight deck 10 such that a freight container 30 to be loaded, with a freight floor outline 33, irrespective of its position, is always in engagement with at least one freight handling device 50 to 50''''. Since the loading and unloading region is often used to rotate and align the freight containers 30, here a higher number of freight handling devices 50 to 50'''' can be provided.

Figure 5:
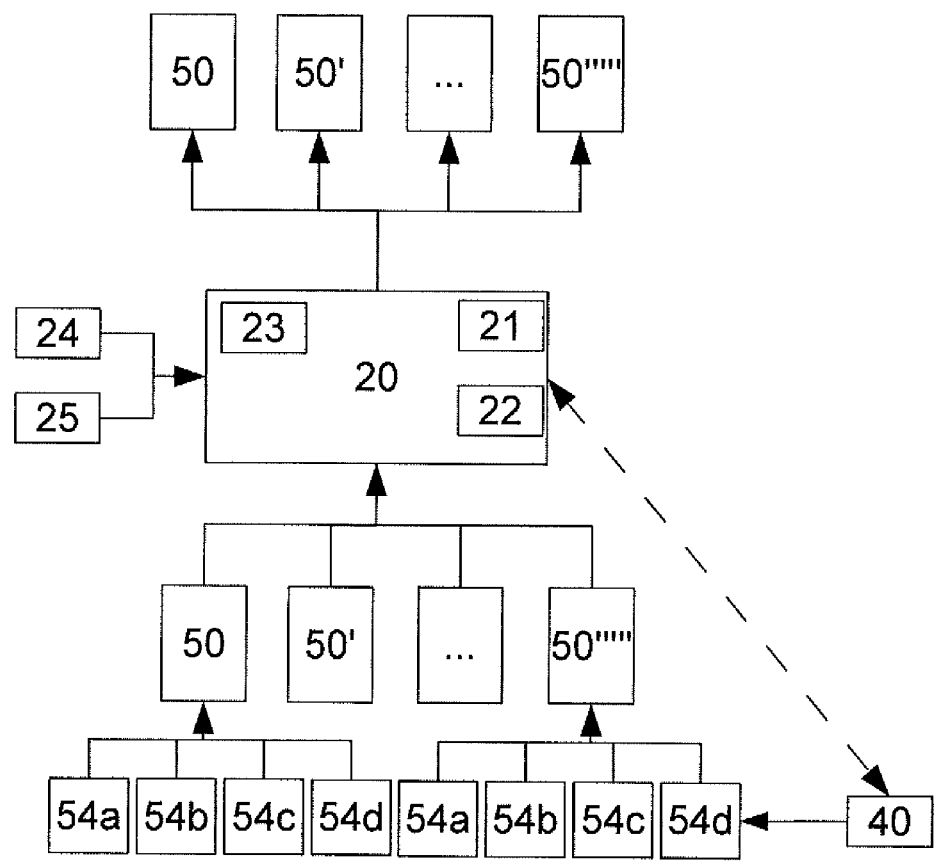
FIG. 5 shows a diagrammatic depiction of individual components of the freight loading system.
Figure 6:
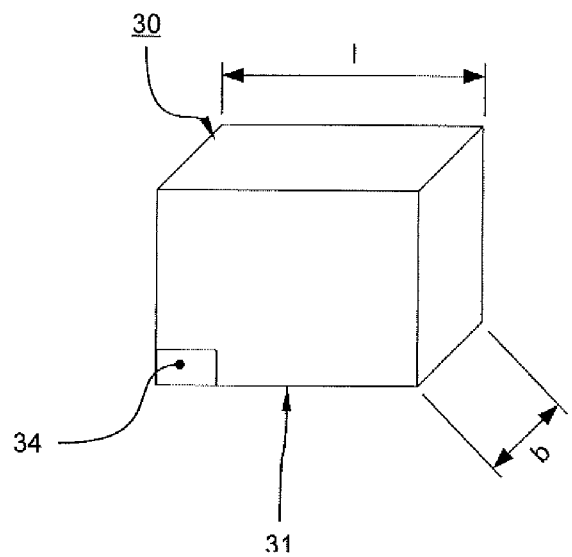
FIG. 6 shows a diagrammatic depiction of a freight item.

On either side of the door opening 7, RFID sensor devices 25, 25' are arranged which can detect an RFID tag 34 on the freight container 30 (see FIG. 6). To this extent a control computer 20 connected with the RFID sensor devices 25, 25' (see FIG. 5) can unambiguously identify an incoming freight container 30. An identification number obtained can be used to determine the freight container width b and freight container length l, i.e. the dimensions of the freight container 30. Alternatively the RFID tag 34 can comprise concrete information on these dimensions. In a further embodiment example a laser scanner can be arranged at the door opening 7 or at any other suitable position to determine the dimensions of the incoming freight container 30. Both the RFID sensor devices 25, 25' and a corresponding laser scanner are purely optional equipment of the freight loading system according to the invention, which facilitate positioning of the freight container 30 on the freight deck 10. A corresponding freight item position determination can however also take place without these devices.

Figure 7:
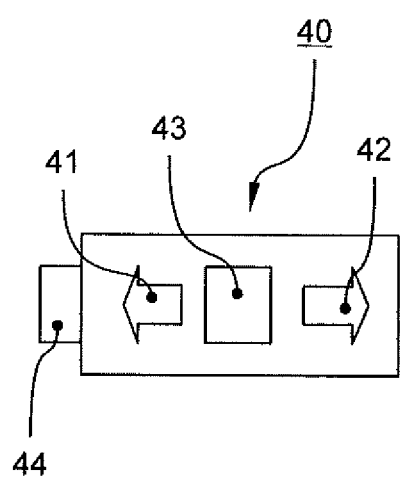
FIG. 7 shows the remote control for the output of control signals for a control computer.

In a first embodiment example of the invention, the control computer 20 knows the position of the freight container 30 (see freight floor outline 33) and that of a user (see user outline 8) holding a remote control 40 (see FIG. 7) in his hand. A corresponding remote control 40 can comprise various control elements, namely a forward button 41, a back button 42 and a rotation button 43. Furthermore a remote control transmitter 44 is provided which allows direct or indirect communication with the control computer 20. By means of the remote control 40 therefore control signals can be output depending on the control device actuated. According to the invention the control computer 20 is formed such that on actuation of the forward button 41, a selected freight container 30 moves towards the user, while actuation of the back button 42 leads to the selected freight container 30 moving away from the user.

If we consider for example the embodiment example shown in FIG. 1 with the user outline 8 and the freight floor outline 33, actuation of the back button 42 leads to the control computer calculating a transport direction r which transports the freight item, in particular the freight container 30, away from the user. In the concrete embodiment example shown, actuation of the back button 42 leads to the control computer 20 calculating the transport direction r, selecting a quantity of freight handling devices covered by the freight container 30, namely a first freight handling device 50, a second freight handling device 50', a third freight handling device 50" and a fourth freight handling device 50''', orienting and driving these such that the freight container 30 is moved in the transport direction r.

Figure 2:
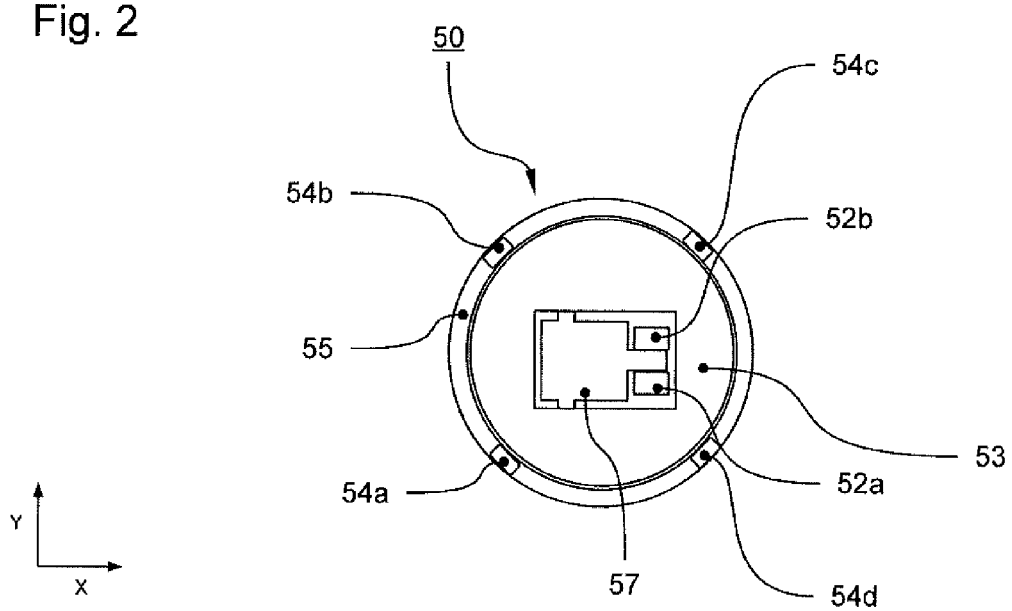
FIG. 2 is a detailed view of a freight handling device from FIG. 1.

In the embodiment example, the freight handling devices 50 to 50'''' are in communicative connection with the control computer 20 via a bus (e.g. a CAN-bus) and serve as sensors and actuators for this. As shown in FIG. 2, a freight handling device 50 consists of an annular frame 55 and a circular rotation plate 53 arranged in the frame 55. The rotation plate 53 is mounted rotationally mobile within the frame 55 such that this can be rotated in the X-Y plane about a rotation axis. The freight handling device 50 has corresponding actuators and sensors so that the rotation plate 53 can be oriented arbitrarily within the frame 55. Sensors give information on the orientation of the rotation plate 53 within the frame 55.

The rotation plate 53 accommodates a roller drive unit 57 which drives the drive rollers 52a, 52b. The drive rollers 52a, 52b are adapted to drive the freight container 30 in a direction transverse to the rotation axis of the drive rollers 52a, 52b substantially within the X-Y plane. For the expert active in this field, it should be clear that the freight container 30 can also be transported in the opposite direction by driving the drive rollers 52a, 52b in the opposite direction of rotation.

The freight handling device 50 and every other freight handling device 50' to 50'''' can furthermore comprise four light sensors 54a, 54b, 54c, 54d which are arranged on the frame 55. To this extent the orientation of the rotation plate 53 does not affect the position of the light sensors 54a, 54b, 54c, 54d. Preferably the light sensors 54a, 54b, 54c, 54d are arranged in pairs on opposite sides of the frame 105. Thus the first light sensor 54a is arranged at the 45° region of the freight handling device 50, the second light sensor 54b in the 135° region, the third light sensor 54c in the 225° region and the fourth light sensor 54d in the 315° region. Light sensors 54a, 54b, 54c, 54d comprise light-emitting diodes and photodiodes so that the light sensors 54a, 54b, 54c, 54d are able to detect the presence of a freight item, in particular a freight container, directly above the light sensors 54a, 54b, 54c, 54d. By means of the light sensors 54a, 54b, 54c, 54d provided on each freight handling device 50 to 50'''', the control computer 20 can determine relatively precisely whether and how far a specific freight handling device 50 to 50'''' is covered by a freight container 30. To this extent the control computer 20 can determine the position of the freight container 30 relatively precisely from this information.

Furthermore the light sensors 54a, 54b, 54c, 54d can be adapted to receive the control signals from the remote control 40 which are output via the remote control transmitter 44. These control signals are then passed on via the bus to the control computer 20.

In the embodiment example described, the transmission power of the remote control transmitter 44 is weak such that control signals can only be received within a radius of a few meters (e.g. up to 2 m). Depending on orientation of the remote control therefore, the control signals allocated to actuation of the back button 42 are received only by light sensors 54a, 54b, 54c, 54d of the fifth or sixth freight handling device 50'''', 50''''. This information itself is sufficient to determine an approximate position and orientation of the remote control 40 on the freight deck 10. So by evaluating this information, the control computer 20 knows that the user with the remote control 40 is standing, in the image plane, below the freight floor outline 33, i.e. the freight container 30. To this extent the information obtained is sufficient to determine the transport direction r as a function of the position of the remote control 40.

The example already described can be explained in more depth with reference to FIG. 5 which shows the individual components of the freight loading system. The control signals from the remote control 40 are for example received by the sixth freight handling device 50'''', in particular by the light sensor 54, and passed on to the control computer 20. To this extent there is an indirect communication with the control computer 20. The control computer 20 comprises a position determination device 23 which establishes from which freight handling device 50 to 50'''' the control signals were received. The individual positions of the individual freight handling devices 50 to 50'''' are stored in a memory device 21 so that the position determination device 23 can determine a position of the remote control 40 from identification of the sixth freight handling device 50''''. The position determination device 23 then scans the light sensors 54a, 54b, 54c, 54d of all freight handling devices 50 to 50'''' and can establish which of these light sensors 54a, 54b, 54c, 54d is covered by a freight container 30. Since the control computer 20 knows the dimensions of the freight container 30 because of the RFID sensor device 25, the position of the freight container 30 can be determined relatively precisely, again taking into account the positions of the freight handling devices 50 to 50'''' covered by the freight container 30. The control computer 20 can thus generate a model of the freight container 30 by means of a model generator 22 to facilitate the position determination by the position determination device 23.

Insofar as the positions of the freight container 30 and the remote control 40 have been determined, the control computer 20 can evaluate the control signals and taking into account these positions, interpret these such that the first freight handling device 50, the second freight handling device 50', the third freight handling device 50" and the fourth freight handling device 50''' can be selected and actuated such that the freight container 30 is transported in the freight transport direction r.

Figure 4:
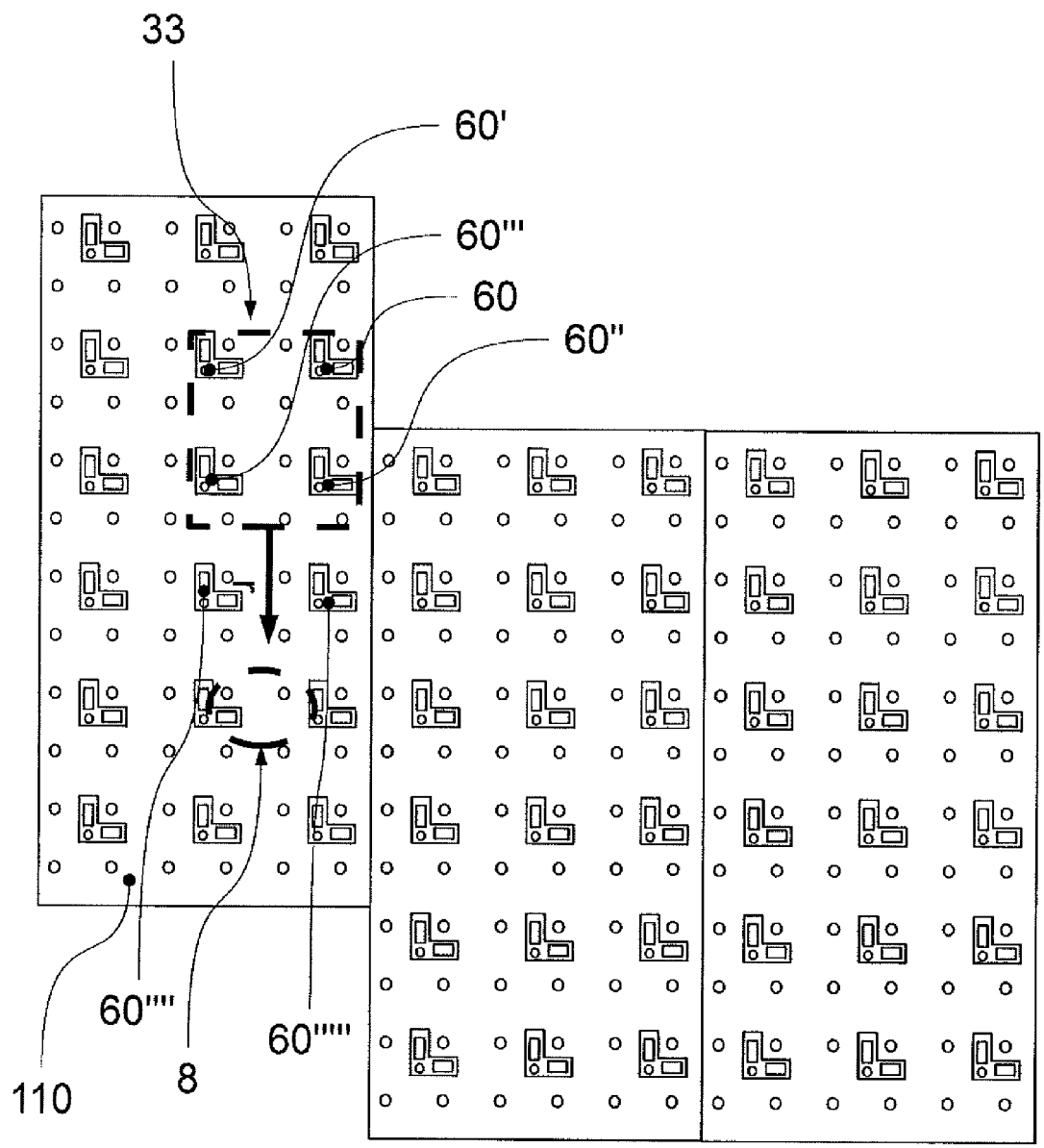
FIG. 4 is a top view of a freight deck in a logistics centre.

FIG. 4 shows a second embodiment example of a freight loading system according to the invention. This is located in a logistics centre which serves as a transhipment hub for freight containers 30. Here freight containers 30 can be stored temporarily or transported from a specific input to a specific output. FIG. 4 shows a freight deck 110 consisting of several elements and equipped with roller tracks in the same manner as the freight deck 10. Freight handling devices 60 to 60'''' which differ in design from the freight handling devices 50 to 50'''' are arranged in a grid on the freight deck 110.

Figure 3:
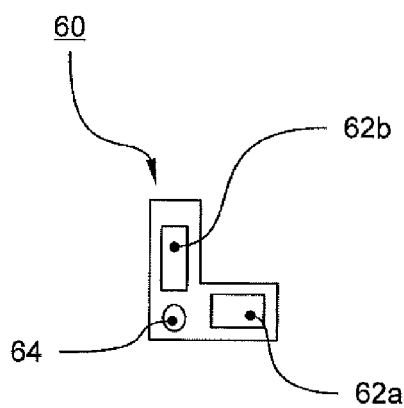
FIG. 3 is a detailed view of a further freight handling device.

FIG. 3 shows a diagrammatic top view of a first freight handling device 60 which comprises a first drive roller 62a and a second drive roller 62b. The drive rollers 62a, 62b are arranged such that they stand at a 90° angle to each other. By means of the freight handling device 60 therefore, a freight item—in particular a freight container 30—can be moved in the Y direction or in the X direction, wherein movement is also possible in the opposite X or Y direction by changing the direction of rotation. The freight handling device 60 is furthermore fitted with a light sensor 64 which again, like the light sensors 54a, 54b, 54c, 54d, contains at least one light-emitting diode and at least one photodiode. To this extent the freight handling device 60 is also able to establish when a specific freight handling device 60 to 60""' is covered by a freight container 30. The light sensor 64 can also be formed as a receiver unit for the control signals from the remote control 40. Alternatively additional receiver units can be provided on the freight handling devices 60 to 60""' for the control signal from the remote control 40. It is also conceivable to distribute these receiver units on the freight deck 110 irrespective of the positions of the freight handling devices 60 to 60""'.

Also the freight handling devices 60 to 60""' communicate with a control computer in a similar manner to the control computer 20 as known from FIG. 5. According to the embodiment example from FIG. 4, the control computer 20 can interpret control signals output in response to actuation of the forward button 41, the back button 42 or the rotation button 43, as a function of the position of the remote control 40. The embodiment example according to FIG. 4 differs in that the position is not determined by means of the receiver units. According to the embodiment example from FIG. 4, the remote control 40 has a GPS system which can pass the actual position of the remote control 40 to the control computer 20.

If for example the user, identified by the user outline 8, of the remote control 40 actuates the forward button 41, the GPS device determines the precise coordinates of the remote control 40. These are transmitted to the control computer 20 together with the corresponding control signals. As already described above, the control computer 20 furthermore determines the precise position of the freight container 30 (see freight floor outline 33). The control computer 20 establishes that the freight container 30 is to be transported towards the user and determines the transport direction r which fulfils this requirement. The control computer 20 then selects a first freight handling device 60, a second freight handling device 60', a third freight handling device 60" and a fourth freight handling device 60''' to implement the movement of the freight container 30.

Correspondingly, rotations can be made by actuation of the rotation button 43 or backward movements by actuation of the back button 42.

In the embodiment examples described above, communication between the control computer 20 and the remote control 40 is always guaranteed indirectly via a freight handling device 50 to 50""', 60 to 60""'. It is of course easily possible to establish communication between the control computer 20 and the remote control 40 directly in wireless or hard-wired form. For wireless communication, for example light waves or electromagnetic waves can be used. In a preferred embodiment example, infrared signals are used.

In the embodiment examples described above, the position of the freight container 30 was determined by means of the light sensors 54a, 54b, 54c, 54d, 64. The expert active in this field will be aware of numerous possibilities for determining the position of the freight container 30 on the freight deck 10 in another way. For example light barriers or GPS receivers can be provided. Also the use of mechanical sensors is conceivable.

Two methods have been described above for determining the position of the remote control 40. For the expert active in this field, there are further possibilities which can easily be integrated in implementation of the invention.

LIST OF REFERENCE NUMERALS 1, 2 Side wall
5 Centre plane
7 Door opening
8 User outline
10, 110 Freight deck
11, 11', 11", 11''' Centre lock
20 Control computer
21 Memory device
22 Model generator
23 Position determination device
24 Input device
25 RFID sensor device
30 Freight container
31 Freight floor
33 Freight floor outline
40 Remote control
41 Forward button
42 Back button
43 Rotation button
44 Remote control transmitter
50 to 50''''' Freight handling device
52a, 52b Drive rollers
53 Rotation plate
54a, 54b, 54c, 54d Light sensor
55 Frame
57 Roller drive unit
60 to 60''''' Freight handling device
62a, 62b Drive roller
64 Light sensor
r Transport direction
l Freight container length
b Freight container width
A Freight loading track A
B Freight loading track B

The invention claimed is:

1. Freight loading system comprising:
a freight deck with a plurality of freight handling devices;
a control unit which is in communicative connection with the freight handling devices for transporting at least one freight item on the freight deck;
a remote control which is in communicative connection with the control unit for the output of control signals to the control unit;
wherein the control unit comprises a position determination unit for determining a remote control position on the freight deck, wherein the control unit is adapted to select a set of freight handling devices and drive the selected set of freight handling devices, the selected set of freight handling devices being determined based upon the control signals received by the control unit from the remote control and the remote control position.

2. Freight loading system according to claim 1, wherein the remote control is adapted to transmit the control signals to the control unit at least partly wirelessly, in particular by means of light waves.

3. Freight loading system according to claim 1, wherein the position determination unit is adapted to determine at least one freight item position of the at least one freight item on the freight deck, wherein the control unit is adapted to drive the freight handling devices as a function of the control signals received, the remote control position and/or the orientation of the remote control and the position of the at least one freight item.

4. Freight loading system according to claim 3, wherein the control unit is adapted to take into account the remote control position and/or the orientation of the remote control relative to the at least one freight item.

5. Freight loading system according to claim 3, wherein the remote control comprises at least one first actuation device to which a "follow" control signal is allocated, wherein the control device is adapted, on receipt of the "follow" control signal, to determine a transport direction in which the at least one freight item is transported in the direction towards the remote control position, and controls the handling devices such that the at least one freight item is transported in the determined transport direction.

6. Freight loading system according to claim 5, wherein the remote control comprises at least one second actuation device to which a "back" control signal is allocated, wherein the control device is adapted, on receipt of the "back" control signal, to determine a transport direction in which the at least one freight item is transported in a direction away from the remote control position, and controls the handling devices such that the at least one freight item is transported in the determined transport direction.

7. Freight loading system according to claim 3, wherein the control device comprises a distance determination device to determine an actual distance between the freight item position and the remote control position, and is adapted to deactivate at least the selected quantity of freight handling devices if the actual distance is less than a predefined safety distance.

8. Freight loading system according to claim 1, wherein the control device is adapted to select from a plurality of freight units, by means of the remote control position and the orientation of the remote control, the one which is to be transported according to the control signals.

9. Freight loading system according to claim 1, including a plurality of receiver units for receiving the control signal and preferably arranged over the surface on the freight deck, wherein the position determination device knows the position of the receiver units and determines the remote control position from the position of the receiver unit which receives a control signal output by the remote control.

10. Method for controlling a plurality of freight handling devices of a freight loading system, in particular a freight loading system according to claim 1, comprising the steps:
reception of a control signal from a remote control, in particular by means of an IR receiver device;
determination of at least one remote control position of the remote control;
determination of at least one freight item position of at least one freight item on a freight deck;
selection of a set of freight handling devices arranged on the freight deck;
determination of a transport direction for each freight handling device from the selected quantity, as a function of the control signal received, the remote control position and the freight item position;
driving of the freight handling devices in the respective transport direction.

11. Method according to claim 10, wherein the selection of the set of freight handling devices is made based upon the remote control position determined and/or an orientation of the remote control.

12. Method according to claim 10, wherein determination of the remote control position comprises determination of a primary receiver unit from a plurality of receiver units arranged on or near the freight deck and determination of the position of the primary receiver unit on the freight deck, wherein the primary receiver unit is the receiver unit which receives the control signal from the remote control.

13. Method according to claim 10, including calculation of an actual distance between the freight item position and the remote control position, wherein the selected freight handling devices are driven only when the actual distance is greater than a predefined safety distance.

14. Method according to claim 10, including a calculation of at least one freight distance between a first freight item and a second freight item, wherein the selected freight handling devices are driven only when the calculated freight distance between the first and second freight items, between which the remote control is located according to the remote control position determined, is greater than a predefined safety distance.

15. Freight loading system comprising:
a freight deck with a plurality of freight handling devices;
a control unit which is in communicative connection with the freight handling devices for transporting at least one freight item on the freight deck;
a remote control which is in communicative connection with the control unit for the output of control signals to the control unit;
wherein the control unit comprises a position determination unit for determining the orientation of the remote control, wherein the control unit is adapted to select a set of freight handling devices and drive the selected set of freight handling devices, the selected set of freight handling devices being determined based upon the control signals received by the control unit from the remote control and the orientation of the remote control.

16. Freight loading system comprising:
a freight deck with a plurality of freight handling devices;
a control unit which is in communicative connection with the freight handling devices for transporting at least one freight item on the freight deck;
a remote control which is in communicative connection with the control unit for the output of control signals to the control unit;
wherein the control unit comprises a position determination unit for determining a remote control position on the freight deck and the orientation of the remote control, wherein the control unit is adapted to select a set of freight handling devices and drive the selected set of freight handling devices, the selected set of freight handling devices being determined based upon the control signals received by the control unit from the remote control and the remote control position and the orientation of the remote control.

17. Freight loading system comprising:
a freight deck with a plurality of freight handling devices;
a control unit which is in communicative connection with the freight handling devices for transporting at least one freight item on the freight deck;
a remote control which is in communicative connection with the control unit for the output of control signals to the control unit;
wherein the control unit comprises a position determination unit for determining a remote control position on the freight deck, wherein the control unit is adapted to select a set of freight handling devices based upon the position of the remote control on the freight deck and to drive the selected set of freight handling devices based upon the control signals received from the remote control.

18. Freight loading system comprising:
a freight deck with a plurality of freight handling devices;
a control unit which is in communicative connection with the freight handling devices for transporting at least one freight item on the freight deck;
a remote control which is in communicative connection with the control unit for the output of control signals to the control unit;
wherein the control unit comprises a position determination unit for determining a remote control position on the freight deck and the orientation of the remote control, wherein the control unit is adapted to select a set of freight handling devices based upon the position of the remote control on the freight deck and to drive the selected set of freight handling devices based upon the control signals received from the remote control and the orientation of the remote control.

* * * * *